E. GUNDLACH.
Eye-Pieces and Objectives for Telescopes and Microscopes.
No. 222,132.    Patented Dec. 2, 1879.
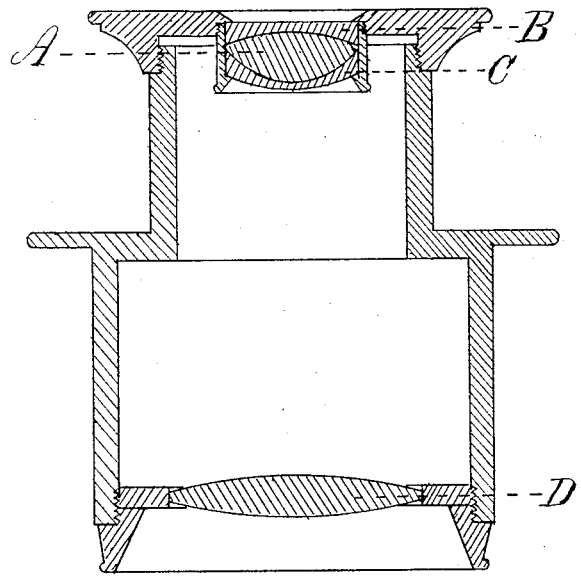
Witnesses:
John C Reich
L. R. Sexton.
Inventor:
Ernst Gundlach.

UNITED STATES PATENT OFFICE.

ERNST GUNDLACH, OF ROCHESTER, NEW YORK, ASSIGNOR TO LEWIS R. SEXTON, OF SAME PLACE.

IMPROVEMENT IN EYE-PIECES AND OBJECTIVES FOR TELESCOPES AND MICROSCOPES.

Specification forming part of Letters Patent No. 222,132, dated December 2, 1879; application filed October 17, 1879.

*To all whom it may concern:*

Be it known that I, ERNST GUNDLACH, of the city of Rochester, county of Monroe, and State of New York, have invented a new and useful Improvement in Objectives and Eye-Pieces for Telescopes and Microscopes and for other optical purposes; and I hereby declare that the following is a full and exact description and specification thereof.

The object of my invention is to construct objectives and eye-pieces that will correct the spherical and the chromatic aberration better and with less loss of light than any device hitherto used.

It is well known that so called "achromatic lenses," composed of a positive crown-glass lens and a negative flint-glass lens—the latter of such negative focus and form that it will not only remove the prismatic colors, but will also, at the same time, correct the so-called "spherical aberration"—always leave, even if the combination is of the best possible construction, a certain amount of both of said errors uncorrected, and these remainders of error are called "aberrations of higher order." In microscope-objectives these aberrations of higher order have been very much decreased by using, in combination, two or more achromatic lenses instead of one, but with the disadvantage that by this method there is a great loss of light in passing so many glass surfaces; and the triple lenses, consisting of an inner negative flint-glass lens and two outer positive crown-glass lenses, (generally used in objectives and also in eye-pieces,) are of but little advantage for decreasing the aberrations of higher order.

My improvement consists in combining, with the other lens or lenses of an objective or eye-piece, one or more triple lenses composed of one inner positive crown-glass lens and two outer negative flint-glass lenses. Such a triplet, having two correcting flint-glass lenses, has very nearly as great power of decreasing the aberrations of higher order as two separate achromatic double lenses together would have.

The aberrations of an eye-piece can be corrected with such a triple lens to that high degree only reached otherwise by two separate achromatic double lenses, and a three-system objective, provided with such a triplet, nearly equals in performance a four-system objective.

For the better understanding of this specification, reference is made to the accompanying drawing, which represents a cross-section of an eye-piece constructed in accordance with my invention.

A denotes the positive crown-glass lens; B and C, respectively, the two outer flint-glass lenses of the triplet, as described above, all three of which are cemented together, and D shows another positive crown-glass lens, which, in combination with the triplet A B C, forms an eye-piece much nearer perfect in regard to the correction of the aberrations and to the flatness of field than had heretofore been attained by other means.

Having thus described the nature of my invention, what I claim as new, and desire to have secured to me by Letters Patent, is—

The combination, in an objective or an eye-piece for a telescope or a microscope, of one or more single or double or multiple lenses with one or more triplets, each triplet to consist of one positive lens inclosed by two negative lenses, and the whole to be constructed in the manner and for the purposes substantially as described.

In testimony whereof I have signed my name to this specification in the presence of two subscribing witnesses.

ERNST GUNDLACH.

Witnesses:
 H. C. MAINE,
 L. R. SEXTON.